US010549365B1

(12) United States Patent
Schinder, II et al.

(10) Patent No.: US 10,549,365 B1
(45) Date of Patent: Feb. 4, 2020

(54) PORTABLE SAW ASSEMBLY

(71) Applicants: Robert C. Schinder, II, Bayville, NJ (US); Robert Schinder, III, Bayville, NJ (US)

(72) Inventors: Robert C. Schinder, II, Bayville, NJ (US); Robert Schinder, III, Bayville, NJ (US)

(*) Notice: Subject to any disclaimer, the term of this patent is extended or adjusted under 35 U.S.C. 154(b) by 0 days.

(21) Appl. No.: 14/472,624

(22) Filed: Aug. 29, 2014

Related U.S. Application Data

(60) Provisional application No. 61/872,309, filed on Aug. 30, 2013.

(51) Int. Cl.
*B23D 59/00* (2006.01)
*B23D 47/04* (2006.01)
*B23D 45/16* (2006.01)

(52) U.S. Cl.
CPC .......... *B23D 59/007* (2013.01); *B23D 45/16* (2013.01); *B23D 47/04* (2013.01); *Y10T 83/68* (2015.04); *Y10T 83/8763* (2015.04)

(58) Field of Classification Search
CPC ... Y10T 83/68; Y10T 83/8763; Y10T 83/667; B23D 59/007; B23D 45/006; B23D 49/002; B23D 45/16; B23D 47/04; B27B 11/04; B27B 17/0083; B23Q 9/0014; B23Q 9/0042
USPC .................................................. 83/745, 574
See application file for complete search history.

(56) References Cited

U.S. PATENT DOCUMENTS

| 776,743 | A | * | 12/1904 | Von Holdt | ............... | B27B 11/00 144/34.1 |
| 793,796 | A | * | 7/1905 | Mummert | ............... | B26D 7/025 83/455 |
| 1,677,922 | A | * | 7/1928 | Kasztler | ................. | B23D 21/08 30/372 |
| 2,378,554 | A | * | 6/1945 | Irwin, Jr. | .................. | B27B 5/10 298/2 |
| 2,608,220 | A | * | 8/1952 | Cauthen | ............... | B23D 45/006 144/2.1 |
| 2,759,242 | A | * | 8/1956 | Goldman | ............. | B23D 49/002 30/372 |
| 3,218,059 | A | * | 11/1965 | Andrew | ................. | B23Q 3/104 269/271 |

(Continued)

FOREIGN PATENT DOCUMENTS

DE  521391 C  *  3/1931  ................ B27F 5/12

Primary Examiner — Laura M Lee
(74) Attorney, Agent, or Firm — FisherBroyles, LLP; J. David Smith

(57) ABSTRACT

A portable saw assembly for use in making square cuts in metal structural components. The portable saw assembly includes a clamping system to hold a work piece in a fixed position with respect to the rotating saw blade and the saw blade is constrained for movement toward and away from the work piece along a specific prescribed path that assures that the saw blade will encounter and then cut the work piece at a right angle with respect to the longitudinal axis of the work piece. Thus, the portable saw assembly can be located on site of the construction and yet can be readily and easily used to cut the structural component along a square cut to facilitate the assembly of the ultimate structure. The clamping system includes clamping inserts to accommodate different sizes and geometric shapes of work pieces while still assuring a square cut thereof.

5 Claims, 3 Drawing Sheets

(56) References Cited

U.S. PATENT DOCUMENTS

| | | | | |
|---|---|---|---|---|
| 3,449,992 A | * | 6/1969 | Hanaway | B23D 45/006 |
| | | | | 30/92 |
| 3,757,628 A | * | 9/1973 | Camacho | B23Q 9/0014 |
| | | | | 83/471.2 |
| 4,377,959 A | * | 3/1983 | DeCarolis | B27G 5/02 |
| | | | | 269/295 |
| 4,625,464 A | * | 12/1986 | Kubo | B23D 45/006 |
| | | | | 30/92 |
| 4,718,201 A | * | 1/1988 | Legge | B23D 45/003 |
| | | | | 30/103 |
| 5,044,075 A | * | 9/1991 | Brennan | B23D 47/02 |
| | | | | 29/33 T |
| 5,199,221 A | * | 4/1993 | Hillestad | B23D 45/006 |
| | | | | 451/154 |
| 5,486,136 A | * | 1/1996 | Noda | B23D 45/006 |
| | | | | 451/347 |
| 6,014,810 A | * | 1/2000 | Earle | B23D 45/006 |
| | | | | 30/101 |
| 2010/0186564 A1 | * | 7/2010 | Pierce | B23D 57/0007 |
| | | | | 83/72 |

* cited by examiner

PORTABLE SAW ASSEMBLY

The present application claims the benefit under 35 U.S.C. § 119(e) of U.S. Provisional Application No. 61/872,309, filed Aug. 30, 2013, the contents of which is hereby incorporated by reference in its entirety.

BACKGROUND

The present invention relates to a portable, hand-held saw assembly for cutting metal structural components, and, more particularly, to a portable saw assembly that can be used by an individual on site to make an accurate square cut in a structural metal component.

There are different types and designs of portable saws that can be used to cut through metal components. Certain of the saws are hand held and are utilized to cut metals for various purposes.

One of the requirements of saws for use with metal structural components, such as metal tubing used in the construction of welded hand railings and the like, necessitates that the saw be portable so that it can be used on site and yet which can cut a square cut that is 90 degrees from the longitudinal axis of the structural component so that the cut component can be joined to other components in the assembly and building of a structure, such as a hand railing.

However, not only must the saw be light enough to be handled by one person, but it also must be combined with some clamping mechanism that holds the metal component or work piece firmly with respect to the saw blade so that the saw blade can be assured to approach the work piece along a prescribed path to consistently make a square cut of the work piece or metal component.

There is also a problem in that the metal components that are used in carrying out the assembly of metal structures, for instance, for a hand railing, may be of varying sizes and shapes for different jobs and thus the clamping mechanism must be adaptable to hold work pieces of different sizes and geometric shapes with large differences in dimensions and cross sectional shapes.

It would therefore be advantageous to have a portable saw assembly that was specially designed and constructed so as to facilitate the cutting of a metal component with an accurate and reliable square cut for cutting and assembling structures, such as hand railings, at the site of the installation.

SUMMARY OF THE INVENTION

Accordingly, the present invention relates to a portable saw assembly that can be used on site of the construction of a structure, such as a hand railing or the like. The portable saw assembly comprises a planar support assembly which comprises a pair of ends that serve in one capacity as stop members, and a fixed track comprising a pair of slide rails extending between said ends. A sliding head assembly or trolley is reciprocably mounted and rides on the fixed track such that the slide rails pass through spaced-apart longitudinal openings in the sliding head assembly. A saw such as a circular saw illustrated herein, is mounted on the sliding head assembly and is adapted for reciprocation along the slide rails, to make contact with a work piece such as a bar or tube, in operation. The saw comprises an electric motor and a saw blade rotatably connected therewith, for cutting the work piece.

As such, the sliding head assembly or trolley can carry the motor and rotating blade toward and away from a work piece along a path that is constrained by the slide rails. The work piece itself is held by a clamping system that is a part of the planar support assembly and is located at and defines one of the ends thereof. The clamping system always assures that the work piece will always be held immovable in a precise orientation with respect to the approaching saw blade. The clamping system is adapted to receive and hold immobile, different sizes and/or shapes of work pieces.

A further aspect of the invention relates to a planar support assembly for use in a portable saw assembly for holding and cutting metal components, which support assembly comprises:

a trolley having at least one opening therethrough, a clamping system for holding a metal component in a fixed position, the clamping system having a longitudinal axis adapted to receive a metal component having different sizes and/or shapes, and at least one slide rail extending outwardly from the clamping system at a right angle with respect to the longitudinal axis of the clamping system, the at least one slide rail passing through the at least one opening in the trolley to constrain the trolley to move along a path at a right angle with respect to the longitudinal axis of the clamping system.

A further aspect of the invention extemds to a method of cutting a work piece by the use of a portable saw assembly, comprising the steps of:

providing a portable saw assembly comprising a power saw having a motor powering a rotating saw blade, the motor being mounted on a trolley having at least one opening therethrough, a clamp block for holding a work piece in a fixed position relative to the motor; the clamp block having a longitudinal axis and at least one slide rail extending outwardly from the clamp block at a right angle with respect to the longitudinal axis of the clamp block and passing through the at least one opening in the trolley, clamping the work piece to the clamp block to align the longitudinal axis of the work piece with the longitudinal axis of the clamp plate, and advancing the sliding head assembly in a path constrained by the at least one slide rail sliding in the at least one opening in the trolley toward the word piece in a path wherein the saw blade contacts the work piece at a right angle to the longitudinal axis of the work piece.

The construction of the present portable power saw assembly ensures that the plane of the rotating saw blade approaches the work piece at a right angle with respect to the longitudinal axis of the work piece so that the saw blade consistently and accurately contacts and cuts the work piece as a square cut and which is then suitable for joining with other structural components in the construction of the ultimate structure.

These and other features and advantages of the present invention will become more readily apparent during the following detailed description taken in conjunction with the drawings herein.

DETAILED DESCRIPTION OF THE INVENTION

Figure 1:
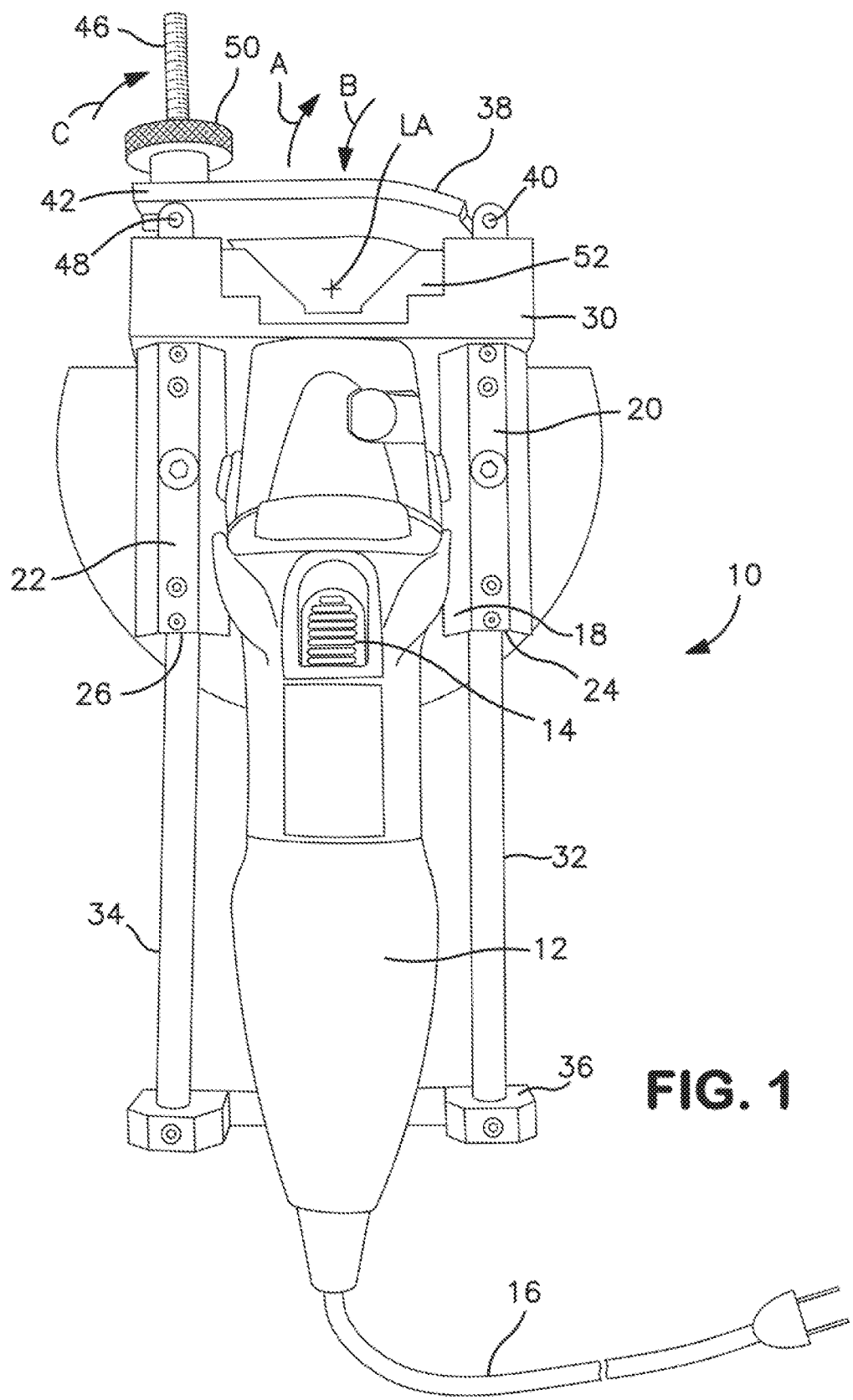
FIG. 1 is line drawing taken from a photograph of the side of the portable saw assembly constructed in accordance with the present invention.
Figure 2:
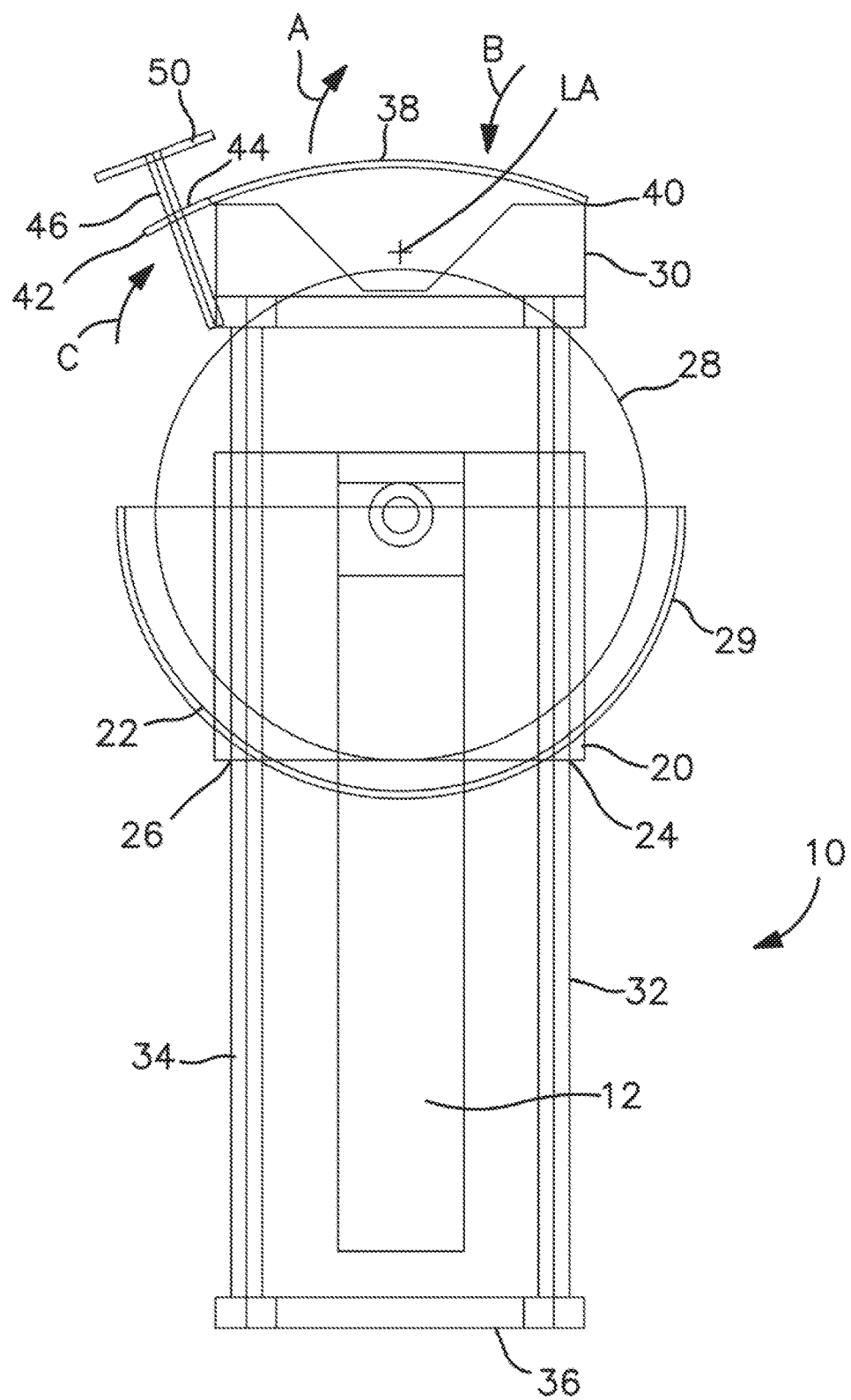
FIG. 2 is a schematic view illustrating the mechanics of the portable saw assembly of FIG. 1.

Referring now to FIGS. 1 and 2, there are shown a line drawing of a photograph and a schematic view, respectively, of a portable saw assembly comprising a planar support assembly 10 constructed in accordance with the present invention. As can be seen, planar support assembly 10 comprises a pair of ends, in turn, corresponding to clamp block 30 of the clamping system, and bottom bracket 36, both also described hereinafter, and a fixed track comprising slide rails 32, 34 that extend between said ends. Sliding head assembly or trolley 18 is reciprocably mounted on slide rails 32, 34 and defines laterally spaced apart housings 20, 22, each of which have a longitudinal opening 24, 26 provided therein that extends the full length of the spaced apart housings 20, 22 and through which slide rails 32, 34 pass.

Referring further to FIG. 1, a saw such as a circular saw is mounted on trolley 18, and includes an electric motor 12 and a saw blade 28 rotatably connected therewith, for cutting the work piece. As explained herein, the saw is mounted to be movable along a well defined path. The electric motor 12 has a conventional on-off switch 14 that allows the user to control the activation of the electric motor and a power cord 16 is provided to supply electricity to the electric motor 12. As described, electric motor 12 operates saw blade 28, and protection to users from the saw blade is provided by a blade guard 29.

The electric motor 12 is commercially available, and for example, could be adapted from a standard, commercially available, hand held, variable speed grinder, and can utilize the shaft of the grinder that extends out the side of the main body of the grinder.

The clamping system of planar support assembly 10 includes clamp block 30 for holding a work piece in the proper position oriented with respect to the saw blade 28. Slide rails 32, 34 as described above, are affixed to clamp block 30 and extend outwardly therefrom. At the end of the slide rails 32, 34 and distal to the clamp block 30, there is a bottom bracket 36 that is affixed firmly to both of the slide rails 32, 34.

The slide rails 32, 34 are preferably constructed of hardened steel and pass though the longitudinal openings 24, 26 in the sliding head assembly 18 in a sliding relationship, such that the sliding head assembly 18 can slide along slide rails 32, 34, toward and away from the ends comprising on one end, clamp block 30 and on the opposite end, bottom bracket 36.

Accordingly, as can now be seen, the electric motor 12 and, of course, the saw blade 28 attached thereto, can move in a path precisely constrained by the slide rails 32, 34 toward and away from the clamp block 30.

The actual path of the saw blade 28 is precisely determined so that the saw blade 28 will approach and cut any work piece held in the clamp block 30 at a right angle, thereby forming a perfectly square cut to the work piece. To accomplish that, it is necessary that the clamp block 30 have a longitudinal axis LA that is properly aligned with respect to the saw blade 28 and that the work piece can be nested into and clamped to the clamp block 30 so that the longitudinal axis of the work piece is precisely parallel to the longitudinal axis LA of the clamp block 30.

The alignment of the work piece is determined through the use of a clamping system that assures the work piece is precisely and firmly held in the clamp block 30 so that the longitudinal axis of any work piece is aligned exactly with the longitudinal axis LA of the clamp block 30.

In the exemplary embodiment, the clamping system comprises a clamp fixture 38 that is pivotally affixed to the clamp block 30 at a pivot point 40 such that the distal end 42 of the clamp fixture 38 can be rotated around the pivot point 40. The distal end 42 of the clamp fixture 38 is bifurcated such that there is an open slot 44 formed at the distal end 42 of clamp fixture 38.

There is also a stem 46 that is pivotally affixed to the clamp block 30 at a pivot point 48. In the exemplary embodiment shown in FIGS. 1 and 2, the stem 46 is threaded and a clamp 50 is threadedly affixed to the stem 44.

Accordingly, to clamp a work piece within the clamp block 30, the clamp fixture 38 is moved to an open position by rotating the distal end 42 outwardly in the direction of the arrow A. At that point, a work piece can be inserted into the clamping system and placed against the clamp block 30.

The clamp fixture 38 can then be rotated in the direction of the arrow B to encompass the work piece and hold it against the clamp block 30. The clamp fixture 38 can then be locked into that closed position by rotating the threaded stem 46 in the direction of the arrow C such that the threaded stem 46 enters into the open slot 44 in the distal end 42 of the clamp fixture 38 and the clamp 50 screwed toward the clamp fixture 38 to hold a work piece firmly against the clamp block 30.

As can be seen, therefore, the clamp fixture 38 can be moved between an open position where a work piece can be inserted therein and seat against the clamp block 30 and a closed position wherein the clamp fixture 38 holds the work piece firmly against the clamp block 30 and locked into that position by screwing the clamp 50 against the clamp fixture 38.

Once the work piece is clamped into position against the clamp block 30, it is assured that the longitudinal axis of the work piece is precisely parallel to the longitudinal axis LA of the clamp block 30.

In FIG. 2, there can also be seen, a clamp insert 52 that can be attached to the clamp block 30 and the clamp insert 52 may have different configurations so as to adapt to the clamping of different dimensions and/or shapes of work pieces. For example, the dimensions and geometry of the clamp insert 52 may have a larger of smaller cavity depending upon the diameter of the work piece and may accommodate a round work piece or one that is of other geometric shapes such as square, triangular and the like.

Figure 3:
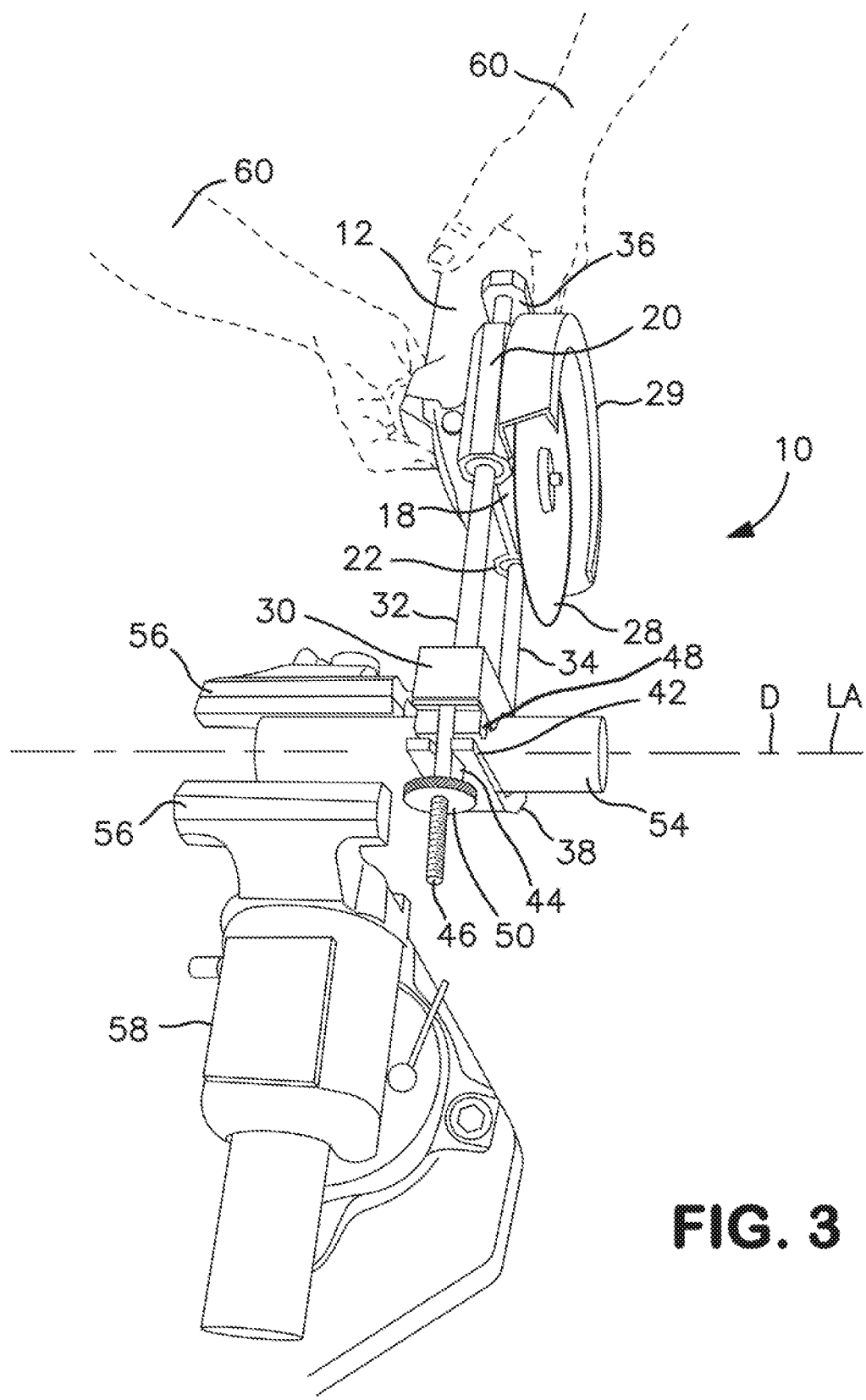
FIG. 3 is a line drawing taken from a photograph illustrating the use of the portable saw assembly of FIG. 1 in cutting a work piece.

Turning then to FIG. 3, there is a perspective view illustrating the use of the planar support assembly 10 of the portable saw of the present invention used to carry out the cutting of a work piece 54 that is securely clamped between the jaws 56 of a vise 58 so as to be immobile.

It is noted that the need for a vise 58 is optional and included as one exemplary embodiment. In the use, however, of the present invention, one advantage is that the work piece 54, be it a pipe or some component of a hand railing, can be hand held or held by some other securing means such that the user can still efficiently cut the work piece and be assured of a perfectly square cut.

The work piece 54 may be any metal structural component of a material such as aluminum or steel and, in the exemplary embodiment, may be used for the construction of a structure such as a hand railing on site. The work piece 54 has a longitudinal axis D.

As can be seen, the slide rods 32, 34 extend outwardly from the clamp block 30 and the orientation of the slide rods 32, 34 are such that the longitudinal axes of the slide rods 32, 34 are precisely at a right angle with respect to the longitudinal axis LA of the clamp block 30 and, therefore, also precisely at a right angle with respect to the longitudinal axis of the work piece 54. As such, the saw blade 28 approaches and cuts the work piece 54 at exactly a right angle and thus a square cut is made consistently in the work piece 54.

As indicated, the work piece 54 may be aluminum, steel or other composition and thus the saw blade 28 is removable and replaceable with an appropriate saw blade depending on the material being cut. For example, when the material is a stainless steel, the saw blade can be an abrasive blade rotating at a relatively slow speed, whereas, if the material of the work piece 54 is aluminum, the saw blade may be a carbide-tipped material with a relatively faster rotational speed.

In any event, returning to FIG. 3, the hands 60 of a user can be seen moving the sliding head assembly 18 including the saw blade 28 toward the work piece 54 that is held securely in the vise 58. Since the alignment of the saw blade 28 is inherently built into the portable saw assembly 10, as previously described, the saw blade 28 can cut the work piece 54 easily and with the assurance to the user that the cut will be a square cut and the cut end of the work piece 54 can be readily aligned and secured to another structural component in the assembly of the ultimate construction.

Those skilled in the art will readily recognize numerous adaptations and modifications which can be made to the portable saw assembly and method of use thereof of the present invention which will result in an improved portable saw assembly and method, yet all of which will fall within the scope and spirit of the present invention as defined in the following claims. Accordingly, the invention is to be limited only by the following claims and their equivalents.

What is claimed is:

1. A planar support assembly for use in a portable saw assembly for holding and cutting metal components, said support assembly comprising:
    a trolley configured for supporting a rotating saw blade having at least two openings therethrough,
    a clamping system for holding a metal component in a fixed position, comprising a clamp block having a removable clamp insert, and a clamp fixture that when in a closed position retains a work piece in a desired location in the clamp block with respect to a rotating saw blade and that when in an open position a work piece can be nested into or removed from the clamp block, the clamping system having a longitudinal axis between the clamp block and the clamp fixture adapted to receive a metal component having different sizes and/or shapes, wherein a locking mechanism is pivotally attached to the clamp block, wherein the locking mechanism is movable to lock the clamp fixture in its closed position, and
    at least two slide rails extending outwardly from the clamp block at a right angle with respect to the longitudinal axis between the clamp block and the clamp fixture, each rail of the at least two slide rails passing through a respective one of said openings in the trolley to constrain the trolley to move along a linear path along the slide rails with respect to a metal component at a right angle with respect to the longitudinal axis of the clamping system.

2. A portable saw assembly for holding and cutting metal components, the portable saw assembly comprising:
    a planar support assembly comprising a clamping system for holding a metal component in a fixed position, the clamping system having a clamp block adapted to receive a metal component, the clamping system adapted to hold a metal component having different sizes and/or shapes, wherein the clamp block comprises a removable clamp insert, and a clamp fixture that when in a closed position retains a work piece in a desired location in the clamp block with respect to the rotating saw blade and that when in an open position a work piece can be nested into or removed from the clamp block, wherein a locking mechanism is pivotally attached to the clamp block, wherein the locking mechanism is movable to lock the clamp fixture in its closed position, and
    the planar support assembly further comprising at least two slide rails extending outwardly from the clamp block at a right angle with respect to the longitudinal axis between the clamp block and the clamp fixture, and a trolley having at least two openings, each rail of the at least two slide rails passing through a respective one of said openings in the trolley to constrain the trolley to move along a linear path along the slide rails with respect to a metal component at a right angle with respect to the longitudinal axis between the clamp block and the clamp fixture, and
    a power saw, the power saw comprising a motor powering a rotating saw blade, the power saw being mounted on the trolley.

3. The portable power saw assembly as defined in claim 2 wherein the at least two slide rails are comprised of hardened steel.

4. A method of cutting a work piece by the use of a portable saw assembly, comprising the steps of:
    providing a portable saw assembly comprising a power saw having a motor powering a rotating saw blade, the motor being mounted on a trolley having at least two openings therethrough, a clamp block for holding a work piece in a fixed position relative to the motor; a clamping system having a longitudinal axis between the clamp block and a clamp fixture and at least two slide rails extending outwardly from the clamp block at a right angle with respect to the longitudinal axis and passing through respective openings in the trolley,
    clamping the work piece to the clamp block to align the longitudinal axis of the work piece with the longitudinal axis of a clamp plate wherein the clamp block has a removable clamp insert, and a clamp fixture that when in a closed position retains a work piece in the clamp block in a desired location with respect to the rotating saw blade and that when in an open position a work piece can be nested into or removed from the clamp block, wherein a locking mechanism is pivotally attached to the clamp block, wherein the locking mechanism is movable to lock the clamp fixture in its closed position, and
    advancing the trolley in a linear path constrained by each rail of the at least two slide rails sliding in a respective one of said openings in the trolley toward the work piece solely in a linear path along the slide rails with respect to a work piece clamped in the clamp block wherein the saw blade contacts the work piece at a right angle to the longitudinal axis of the work piece.

5. A system for making a square cut in a work piece, the system comprising;
    a portable saw assembly comprising a motor powering a rotating saw blade, the motor being mounted on a trolley having openings therethrough,
    a clamping system for holding a metal component in a fixed position relative to the motor, the clamping system having a longitudinal axis and being adapted to hold a metal component having different sizes and/or shapes wherein the clamping system comprises a clamp block having a removable clamp insert, and a clamp fixture that when in a closed position retains a work piece in the clamp block in a desired location with respect to the rotating saw blade and when in an open position a work piece can be nested into or removed from the clamp block, wherein the longitudinal axis is between the clamp block and the clamp fixture, wherein a locking mechanism is pivotally attached to the clamp block, wherein the locking mechanism is movable to lock the clamp fixture in its closed position;

a work piece held in the clamping system such that the longitudinal axis of the work piece is parallel to the longitudinal axis of the clamping system, at least two slide rails extending outwardly from the clamp block at a right angle with respect to the longitudinal axis of the clamping system and the work piece, the at least two slide rails passing through respective openings in the trolley to constrain the power saw to move solely along a linear path along the slide rails at a right angle with respect to the longitudinal axis of the work piece, and wherein the at least two slide rails comprise a pair of rails, each rail of said pair of rails passing through a respective one of said openings in the trolley.

\* \* \* \* \*